Figure 1:
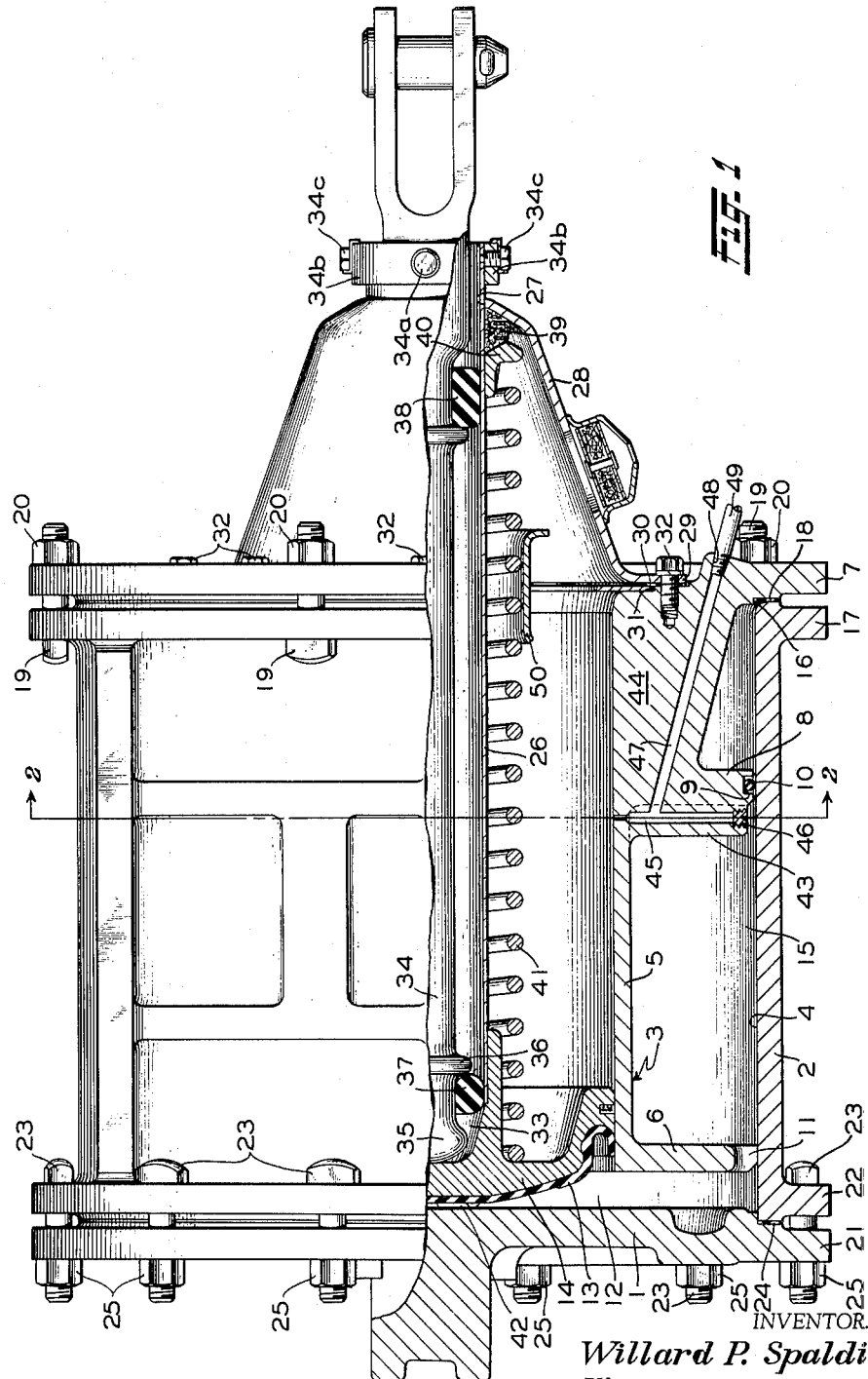

Jan. 4, 1966     W. P. SPALDING     3,227,053
CONVERSION BRAKE CYLINDER

Filed Feb. 26, 1964     2 Sheets-Sheet 2

INVENTOR.
Willard P. Spalding
BY A.A. Steinmiller
Attorney

United States Patent Office 3,227,053
Patented Jan. 4, 1966

3,227,053
CONVERSION BRAKE CYLINDER
Willard P. Spalding, Verona, Pa., assignor to Westinghouse Air Brake Company, Wilmerding, Pa., a corporation of Pennsylvania
Filed Feb. 26, 1964, Ser. No. 347,596
5 Claims. (Cl. 92—59)

This invention relates to brake cylinder devices and, more particularly, to means for readily and inexpensively converting existing large size brake cylinder devices to relatively smaller size brake cylinders suitable for use with molded brake shoes in existing railway braking equipment in place of customary cast iron brake shoes.

The molded type of brake shoe, as referred to herein, may consist of a composition material that includes, for example, cast iron chips molded with a binding medium comprising rubber and resin. A composition suitable for use as a molded type brake shoe is disclosed, for example, in United States Patent No. 2,686,140, issued to C. L. E. De Gaugue, Jr., on August 10, 1954. The molded type brake shoes have a much higher coefficient of friction than cast iron type shoes and retain an almost constant coefficient of friction over a wide range of vehicle wheel speeds thereby requiring a lesser brake shoe applying pressure than for cast iron shoes to effect the same degree of braking on the wheels of a railway car.

Tests conducted with the molded type brake shoes show that, for obtaining substantially corresponding braking effect, approximately one-fourth of the application force is required for the molded type brake shoes as is required for the cast iron type brake shoe commonly used on the American railroads at the present time. Such tests indicate that the application force exerted by the present existing brake cylinders and brake rigging is far in excess of that necessary for the molded type of brake shoes. Simply using a lesser degree of fluid pressure or reducing the size of the brake cylinder to reduce the braking force applied to the shoe will introduce complications because of pressure equalization problems incident to the use with existing fluid pressure brake control valve devices. Moreover, modification or complete replacement of existing brake control equipment and brake rigging on railway cars, to conform to the requirements of the molded type of brake shoe, would be very costly and economically would not warrant the change-over to molded brake shoes in many instances.

In Patent No. 2,880,043 issued March 31, 1959, to William C. Landis, and assigned to the assignee of this application, there is disclosed and claimed a conversion liner or element for use with existing brake cylinder devices that comprises a cylindrical sleeve in which is slidably mounted a piston smaller in diameter than the original piston used prior to the conversion, the wall thickness of the sleeve being such that the equalizing volume provided in the converted brake cylinder including the annular space between the outside of the sleeve and the inside wall surface of the brake cylinder body is substantially the same as the equalizing volume in the existing brake cylinder before the conversion was made. This conversion element is limited to use with brake cylinders that do not require a port in the cylinder wall via which to supply fluid under pressure to a slack adjuster device when the piston travel becomes excessive due to wear of the brake shoes.

Accordingly, it is an object of this invention to provide a simple and relatively low cost device for effecting a conversion of existing brake cylinders so as to adapt these existing brake cylinders to deliver the proper amount of applying force to the molded type of brake shoe without interfering with the proper operation of the existing pneumatic brake control equipment presently on the car and which makes provision for operation of a slack adjusting mechanism when piston travel becomes excessive.

According to the invention, a relatively thin-walled tubular or sleeve-like conversion element adapted for coaxial mounting within the original brake cylinder carries a flange intermediate the ends thereof having a peripheral groove formed therein for receiving an O-ring that forms a seal with the wall of the bore in the brake cylinder body, the location of the flange being selected to provide appropriate equalization volume corresponding to the equalization volume of the original cylinder, for a selected diameter of piston in the conversion element. Thus, with a selected piston area for providing the required brake shoe applying force at the equalization pressure between the auxiliary reservoir and the brake cylinder, the provision of an equalization volume determining flange makes the use of the conversion element practical for different types and sizes of brake cylinders in accordance with brake applying force requirements.

The invention further comprises a single sleeve type of conversion liner or sleeve having a radially extending web thereon via which a slack adjuster control port in the wall of the conversion element may be connected through a passage in the web to the exterior of the brake cylinder.

Figure 2:
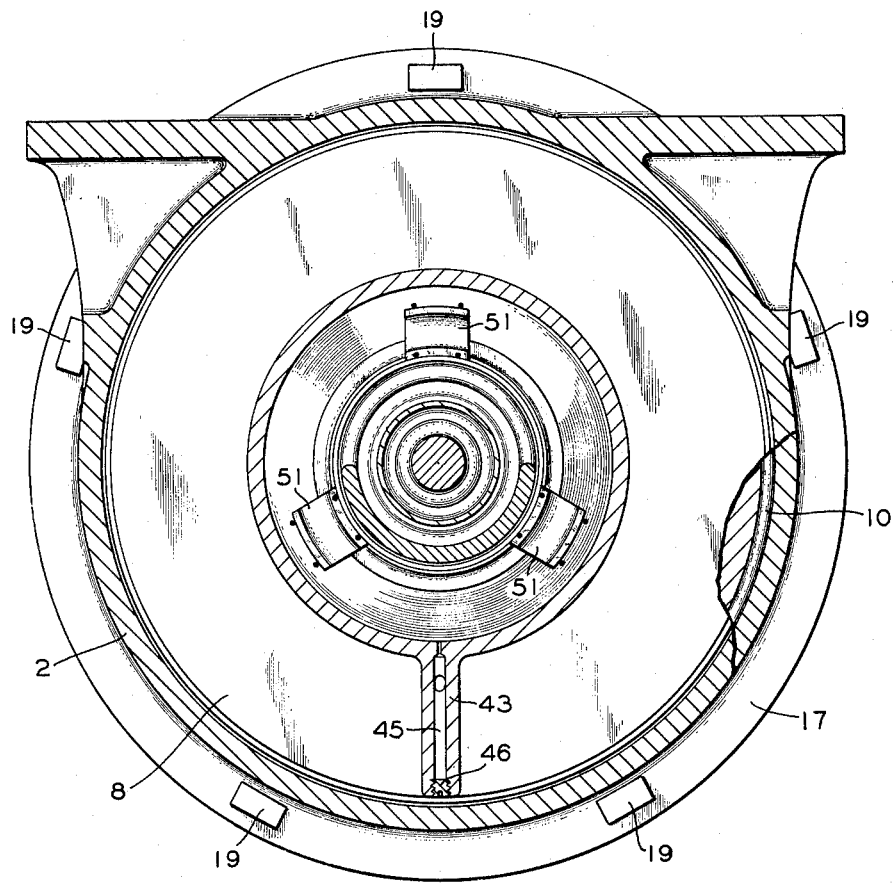

In the accompanying drawings:

FIG. 1 is an elevational view, partly in section, of a brake cylinder device embodying the novel conversion element of the present invention, and FIG. 2 is a vertical cross-sectional view, taken along the line 2—2 of FIG. 1 and looking in the direction of the arrows, showing further details of the passageway provided in a radially extending boss or web on the conversion element, through which passageway fluid under pressure may be supplied from the pressure chamber of the brake cylinder to a slack adjuster mechanism via a port in the conversion element when the port is uncovered by excessive piston travel.

*Description*

As shown in the drawings, a brake cylinder device embodying the invention comprises the usual pressure head 1 and brake cylinder body 2 but differs from conventional brake cylinders in having a hollow cylindrical conversion element 3 disposed in the usual bore 4 in the brake cylinder body 2. The cylindrical conversion element 3 comprises a sleeve 5 that is provided at its respective left and right-hand ends with out-turned annular flanges 6 and 7. Intermediate its ends the sleeve 5 is provided with a third out-turned annular flange 8 that is located nearer the flange 7 than the flange 6. The out-turned flange 8 is provided with a peripheral annular groove 9 in which is disposed an O-ring 10 the outer periphery of which cooperates with the wall of the bore 4 in the brake cylinder body 2 to form a seal therewith. The annular flange 6 is provided with a plurality of arcuately spaced ports 11, only one of which appears in FIG. 1 of the drawings, in order that fluid under pressure supplied to a pressure chamber 12 formed between the pressure head 1 and a packing cup 13 secured to a piston 14 may flow to a chamber 15 formed by the cooperative relation of the annular flanges 6 and 8, the outer periphery of the sleeve 5, and the wall surface of the bore 4 in the brake cylinder body 2, because the volume of the chambers 12 and 15, along with the volume to the left of the piston 14 as the piston 14 moves in the direction of the right hand to its application position, provides a volume in the modified brake cylinder device that is substantially equivalent to the volume of the old brake cylinder device, it being understood that the location of the annular flange 8 is so selected that the combined volume of the chamber 12 with that of the chamber 15 is substantially equal to the volume of the old brake cylinder device assuming equivalent normal full piston travel in both instances. By thus retaining substantially the same brake cylinder equalization volume, it is possible to retain on a railway car the same auxiliary reservoir and associated fluid pressure operated devices for effecting the supply of fluid under pressure from the auxiliary reservoir to the modified brake cylinder to obtain the desired reduced braking force on the wheels of the car.

The left-hand side of the annular flange 7 has a cutback or offset surface 16 machined thereon, as shown in FIG. 1, and between which and an annular flange 17 formed on the right-hand end of the brake cylinder body 2, is disposed an annular seal gasket 18. The annular seal gasket 18 is clamped between the cutback or offset surface 16 and the flange 17 by a plurality of bolts 19 and nuts 20. The bolts 19 extend through the holes that are presently in the flange 17 formed on the right-hand end of the brake cylinder body 2 and corresponding holes formed in the flange 7 formed on the right-hand end of the sleeve 5 of the conversion element 3. The bolts 19 and nuts 20 may be the same set of bolts and nuts formerly used to secure the previously used non-pressure head to the flange 17 on the brake cylinder body 2.

The pressure head 1 is provided with an annular flange 21 and the left-hand end of the brake cylinder body 2 is provided with an annular flange 22, each of these flanges being provided with a plurality of arcuately spaced holes for receiving bolts 23. An annular seal gasket 24 is disposed between the left-hand end of the brake cylinder body 2 and the right-hand side of the pressure head 1, which annular gasket is adapted to form a fluid pressure seal when a nut 25 is tightened onto each of the bolts 23. It should be understood that the gasket 24, bolts 23 and nuts 25 secure the pressure head 1 to the flange 22 of the body 2 of the brake cylinder device before the conversion is made and the seal formed by the gasket 24 is not broken when making the conversion as it is not necessary to remove the pressure head 1 for the reason that the conversion element 3, subsequent to removing the old non-pressure head from the right-hand end of the brake cylinder body 2, is inserted into the right-hand end of the bore 4 in the brake cylinder body 2 and then pushed to the position in which it is shown in FIG. 1 of the drawings.

The piston 14 is slidably mounted in the sleeve 5 and a hollow rod 26 secured coaxially to the piston 14 by means of a plurality of rivets (not shown) extends slidably through a central opening or bore 27 in a non-pressure head 28, it being understood that this non-pressure head is a new item and not the same non-pressure head formerly used with the brake cylinder device before the conversion is effected. The non-pressure head 28 is provided with a flange 29 at its left-hand end as viewed in FIG. 1. An annular gasket seal 30 is interposed between the left-hand face of the flange 29 and the right-hand side of a cutback or offset surface 31 machined on the right-hand end of the conversion element 3, as shown in FIG. 1. The non-pressure head 28 is secured to the right-hand end of the cylindrical conversion element 3 by a plurality of cap screws 32 which extend through the corresponding and coaxial holes or bores in the flange 29 and the annular gasket seal 30 and have screw-threaded engagement with coaxial screw-threaded counterbores formed in the right-hand end of the cylindrical conversion element 3.

Piston 14 is provided with a recess 33 that is coaxial with the piston. This recess 33 is adapted to receive one end of a push rod 34. The left-hand end of the push rod 34 is provided with a knob 35 having a spherical outer surface that is disposed in the recess 33 in the piston 14 and rests against the left-hand end thereof. Disposed between the knob 35 and a rib 36 formed on the push rod 34 and arranged coaxially about the push rod 34 is an annular cushioning element 37 which is constructed of rubber or some other suitable material. The push rod 34 also carries thereon a push rod sealing ring 38 that is disposed adjacent the exterior end of the hollow rod 26.

A hollow packing seal 39 is disposed about the hollow rod 26 and between the right-hand end of the non-pressure head 28 and a spring seat 40 also disposed about the hollow rod 26. One end of a brake cylinder release spring 41 rests against the spring seat 40 and the opposite end of this spring rests against the right-hand side of the piston 14.

In order that the hollow rod 26 and the push rod 34 move together when piston 14 is moved to its release position by the release spring 41, the push rod 34 is secured to the hollow rod 26 by a push rod holder pin 34a that extends through two diametrically arranged bores in a collar identified as a push rod holder 34b, two corresponding bores in the hollow rod 26, and a corresponding bore in the push rod 34, it being understood that the push rod holder 34b is secured to the hollow rod 26 by a pair of set screws 34c.

Formed on the packing cup 13 secured to the piston 14 are a plurality of lugs 42 which, when the piston 14 occupies the position in which it is shown in FIG. 1, contact the right-hand side of the pressure head 1 to form between the pressure head 1 and the piston 14 the pressure chamber 12 to which fluid under pressure may be supplied through a passageway (not shown) in the pressure head 1.

As shown in FIGS. 1 and 2, the annular flange 8 has formed on its left-hand side a vertically arranged boss 43. A shown in FIG. 1, extending between the flanges 7 and 8 and on the outside of the sleeve 5 is a web 44, the respective ends of which are integral with the flanges 7 and 8. As shown in FIG. 1, the boss 43 is provided with a passageway 45, the upper end of which open into the interior of the sleeve 5 through a restricted port and the lower end of which is screw threaded to receive a threaded plug 46. As shown in FIG. 1, the web 44 has formed therein, as by drilling, an inclined passageway 47, the upper end of which opens into or intersects the passageway 45 and the lower end of which opens at the right-hand face of the annular flange 7 and is provided with a threaded bore 48 extending inward from the right-hand face of the flange 7 to the passageway 47. The threaded bore 48 is adapted to receive one threaded end of a pipe 49 that may have the opposite end thereof connected to a slack adjuster mechanism (not shown).

In order to maintain the intermediate portion of the spring 41 in substantial concentric relation with the hollow rod 26 and thus prevent the spring 41 from sagging or buckling into contact with the hollow rod and causing damage to the same, there is provided a sleeve 50 which encircles the spring 41 and which has an inside diameter slightly greater than the outside diameter of the spring to allow free movement of the spring through the sleeve. The sleeve 50 is held in place by three radially arranged metallic strips 51, shown in FIG. 2 of the drawings, one end of each being welded to the sleeve 50 and the opposite end welded to the interior of the non-pressure head 28.

It will be noted that by providing the existing brake cylinder device installed on a railway car with the cylindrical conversion element 3, a smaller internal diameter of the cylinder device is thus obtained and the piston 14 used in the cylindrical conversion element 3 is accordingly smaller than the piston previously used in the brake cylinder body 2. Therefore, the force exerted by the piston 14 on the brake shoe (not shown) as compared to the force exerted by the old type piston is reduced proportionally to the reduction in piston area without substantially reducing the equalizing volume of the brake cylinder device, because, as hereinbefore stated, the volume of the chamber 12 along with the volume of the chamber 15 and the volume to the left of the piston 14 as the piston moves in the direction of the right hand to its application position, provides a volume in the modified brake cylinder device that is substantially equivalent to the volume of the old brake cylinder device, with the consequent equivalent pressure or equalization incidental to a brake application. By thus retaining substantially the same equalization volume, it is possible to retain on the railway car the same auxiliary reservoir and associated fluid pressure operated devices for effecting the supply of fluid under pressure from the auxiliary reservoir to the modified brake cylinder to obtain the desired reduced braking force applying the brake shoes on the wheels of the car.

Having now described the invention, what I claim as new and desire to secure by Letters Patent, is:

1. A conversion element for use with an existing brake cylinder device of the type comprising a cylindrical body portion having secured coaxially thereto, at its respective ends, a pressure head and a non-pressure head, said cylindrical body portion normally having coaxially operable therein a piston of a diameter corresponding to the internal diameter of the cylindrical body portion, said conversion element comprising:
  (a) a sleeve corresponding in length substantially to the length of the cylindrical body portion of the brake cylinder device for coaxial disposition therein and adapted to receive therein a piston of corresponding diameter,
  (b) an out-turned perforated flange located at the end of said sleeve adjacent the pressure head and corresponding in diameter substantially to the internal diameter of the cylindrical body portion,
  (c) an out-turned secured flange located at the opposite end of said sleeve and arranged to be secured to a corresponding flange formed at the non-pressure head end of the cylindrical body portion, and
  (d) an out-turned equalization-volume-determining flange located intermediate said perforated flange and said securing flange and provided with a peripheral annular groove therein, said out-turned equalization-volume-determining flange having a diameter less than the internal diameter of the cylindrical body portion, and
  (e) an O-ring disposed in the peripheral annular groove in said out-turned equalization-volume-determining flange for forming a seal with the internal wall surface of the cylindrical body portion.

2. A conversion element, as claimed in claim 1, further characterized in that said out-turned equalization-volume-determining flange is so located intermediate the ends of said sleeve that the annular volume formed between the outside of said sleeve and the internal wall surface of the cylindrical body portion, and between the pressure head and said out-turned equalization-volume-determining flange, insures the same equalization volume subsequent to inserting said conversion element into the cylindrical body portion as that provided in the brake cylinder device prior to inserting said conversion element.

3. A conversion element, as claimed in claim 1, further characterized by a web radially extending from the exterior of said sleeve, and in that said web is provided with a passageway extending therethrough having one end opening into the interior of said sleeve and the other end opening at the exterior of said securing flange on said conversion element whereby to supply fluid under pressure from the pressure chamber for a desired purpose when a piston within the conversion element moves past the said one end of said passageway.

4. A conversion element as claimed in claim 3, further characterized in that the outer face of said securing flange on the conversion element is adapted to receive and support a non-pressure head for the cylinder, and in that the said other end of said passageway opens at said outer face of the said securing flange at a point radially outside the non-pressure head.

5. A conversion element, as claimed in claim 3, further characterized in that said web extends between said out-turned securing flange and said out-turned equalization-volume-determining flange, said web being formed integral with said flange.

References Cited by the Examiner
UNITED STATES PATENTS

| | | | |
|---|---|---|---|
| 2,880,043 | 3/1959 | Landis | 92—59 |
| 3,152,516 | 10/1964 | Allan | 92—59 |

SAMUEL LEVINE, *Primary Examiner.*